No. 778,656.　　　　　　　　　　　　　　　Patented December 27, 1904.

UNITED STATES PATENT OFFICE.

OTTO J. GRAUL, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN.

PROCESS OF MAKING ACID NITRILES.

SPECIFICATION forming part of Letters Patent No. 778,656, dated December 27, 1904.

Application filed December 22, 1903. Serial No. 186,216.

*To all whom it may concern:*

Be it known that I, OTTO J. GRAUL, doctor of philosophy and chemist, a subject of the Duke of Anhalt, residing at Ludwigshafen-on-the-Rhine, in the Kingdom of Bavaria, Empire of Germany, have invented new and useful Improvements in Processes of Manufacturing Acid Nitriles, of which the following is a specification.

My invention relates to the manufacture of acid nitriles from the so-called "Schiff" bases and hydrocyanic acid. W. v. Miller and Plöchl have shown that the said Schiff bases on treatment with concentrated or anhydrous hydrocyanic acid are converted into the nitriles, (*Berichte*, Vol. XXV, page 2020; *cf.* also *Berichte*, Vol. VI, page 748, and Vol. XI, page 246.) Several attempts have been made to improve this process. See, for instance, the specification of Letters Patent No. 718,340 and also the specifications of English Letters Patents Nos. 21,077 of 1901 and 24,461 of 1902. The processes described in the specifications of these two English Letters Patent are based upon the avoidance of the previous preparation of the Schiff base by treating the materials for its formation with a solution of hydrocyanic acid under conditions which are defined in the said specifications. I have now discovered that it is possible to prepare the nitriles from the Schiff bases themselves (both of the fatty and of the aromatic series) with ease and to obtain a good yield. The Schiff bases, which can be used according to my invention, are both the monomolecular and the polymolecular bases obtainable by condensing together an aromatic amido compound and an aromatic aldehyde and also the polymolecular compounds which can be obtained by condensing together an aromatic amido compound and an aliphatic aldehyde, and the acid nitriles obtained according to my invention may be indicated by the general formula

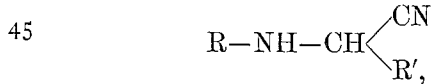

in which the expression R indicates a radical of the aromatic series, whereas R' may indicate a radical generally both aromatic and aliphatic, including the radicals of the aliphatic series $C_nH_{2n+1}$, in which expression n may be equal to 0 or any other number. The preparation is effected according to my invention by treating the said Schiff base after its formation with dilute aqueous or aqueous alcoholic solutions of hydrocyanic acid, provided that an elevated temperature be employed. The most favorable temperature for the purpose varies with different Schiff bases. In some cases the temperature of the water-bath is sufficient, but in others a somewhat higher temperature is necessary. It is preferable to work in closed vessels, as otherwise the hydrocyanic acid is liable to escape. No specially energetic shaking of the materials is necessary, and an ordinary vessel fitted with a stirrer is sufficient for use in the operation.

My invention renders it possible while using an ordinary dilute solution of hydrocyanic acid and a Schiff base powdered in the usual way without the use of any special apparatus and without any difficult treatment to obtain a practically quantitative yield of the desired nitriles.

The following examples will serve to further illustrate the method by which I obtain the nitriles. My invention, however, is not confined to these examples. The parts are by weight.

*Example 1—Preparation of omega-cyan-methyl-anilin.*—Seventy (70) parts of potassium cyanid containing about ninety-five (95) per cent. of KCN dissolved in two hundred (200) parts of water and three hundred (300) parts of ice are placed in a vessel capable of withstanding pressure and provided with a stirrer, and to this is added the equivalent quantity of hydrochloric acid. To this solution, which contains about five (5) per cent. of hydrocyanic acid, are added one hundred and five (105) parts of finely-powdered anhydro-formaldehyde-anilin, and the whole is stirred at ordinary temperature till it becomes a homogeneous paste, whereupon the vessel is closed and heated for two (2) hours in boiling water. After cooling the solidified nitrile can be easily filtered off from the aqueous solution. The reaction proceeds in a similar manner when aethylidene-anilin is used instead of the anhydro-formaldehyde-anilin.

*Example 2—Preparation of phenyl-anilido-acetonitrile.*—Ninety (90) parts of benzylidene-anilin, two hundred (200) parts of crushed ice, and thirty-five (35) parts of potassium cyanid (containing about ninety-five (95) per cent. of KCN) are stirred together in a vessel and sufficient hydrochloric acid is added until the mixture just reacts upon congo paper. The vessel is then closed and heated for two (2) hours at a temperature of between one hundred and forty and one hundred and fifty degrees centigrade, (140° to 150° C.) After cooling the odor of hydrocyanic acid is scarcely recognizable. The dark crystalline mass is filtered off and after one (1) extraction with alcohol it is practically pure phenyl-anilido-acetonitrile.

*Example 3—Preparation of omega-cyan-methyl-paratoluidin.*—The anhydro base obtainable from one hundred and seven (107) parts of paratoluidin and seventy-nine (79) parts of commercial aqueous formaldehyde solution containing about forty (40) per cent. of formaldehyde is finely powdered and introduced, together with five hundred and ten (510) parts of an aqueous solution of hydrocyanic acid containing about five and three-tenths (5.3) per cent. of HCN, into an autoclave provided with a stirrer. This is then heated for two (2) hours while stirring at a temperature of about eighty to one hundred degrees centigrade, (80° to 100° C.) After cooling the nitrile is filtered off and pressed and dried. It possesses a melting-point of sixty-two degrees centigrade, (62° C.)

*Example 4—Preparation of omega-cyan-benzyl-alpha-naphthylamin.*—One hundred and forty-three (143) parts of alpha-napththylamin and one hundred and six (106) parts of benzaldehyde are stirred well together while being heated on the water-bath. Hereupon water splits off and benzylidin-alpha-naphthylamin is formed, which after crystallization out of alcohol, melts at a temperature of from seventy-three to seventy-four degrees centigrade, (73° to 74° C.) This is finely powdered and heated together with six hundred and seventy-five (675) parts of an aqueous solution of hydrocyanic acid containing about four (4) per cent. of HCN in an autoclave for about two (2) hours, while stirring, at a temperature of the boiling-bath. The nitrile obtained after being lightly washed with cold alcohol melts at a temperature of from one hundred and sixteen to one hundred and seventeen degrees centigrade, (116° to 117° C.) Exactly the same procedure is followed to obtain the corresponding nitrile, which melts at a temperature of one hundred and fifteen degrees centigrade (115° C) from benzylidin-beta-naphthylamin, melting-point about one hundred and twelve degrees centigrade, (112° C.)

*Example 5—Preparation of omega-cyan-ortho-chlor-benzyl-anilin.*—One hundred and forty and a half (140.5) parts of ortho-chlor-benzaldehyde and nine-three (93) parts of anilin are gently warmed together for a short time in an open autoclave, whereupon water splits off and the oily Schiff base is formed. To this is added three hundred (300) parts of ethyl alcohol and two hundred and fifty (250) parts of an aqueous solution of hydrocyanic acid containing about eleven (11) per cent. of HCN. The vessel is then closed and the mixture is heated for two (2) hours while stirring at a temperature of about eighty to one hundred degrees centigrade, (80° to 100° C.) After cooling the greater part of the nitrile thus formed is already crystallized out. The remainder can be precipitated from the dilute alcoholic filtrate by the addition of water. The nitrile melts at a temperature of about seventy-seven degrees centigrade, (77° C.)

*Example 6—Preparation of omega-cyan-benzyl-anthranilic acid.*—The benzylidin-anthranilic acid of melting-point one hundred and thirty degrees centigrade (130° C.) obtainable from one hundred and thirty-seven (137) parts of dry anthranilic acid and one hundred and six (106) parts of benzaldehyde is mixed with three hundred (300) parts of methyl alcohol and five hundred and ten (510) parts of an aqueous solution of hydrocyanic acid containing five and three-tenths (5.3) per cent. of HCN. The whole is then heated in an autoclave while well stirring at a temperature of from sixty to seventy-five degrees centigrade, (60° to 75° C.) The formation of the nitrile is completed after a short time. This omega-cyan-benzyl-anthranilic acid melts at a temperature of one hundred and seventy-five degrees centigrade, (175° C.) In a similar manner the ethylidin-anthranilic acid, which is obtainable out of acetyl-aldehyde and anthranilic acid in the presence of water, can be converted into anthranilido-alpha-propio-nitrile, which melts at a temperature of about one hundred and ninety-two degrees centigrade, (192° C.)

I claim—

1. The process for the manufacture of acid nitriles of the general formula

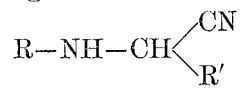

where R and R' represent aromatic hydrocarbon radicals, which process consists in heating a Schiff base with a solution of hydrocyanic acid.

2. The process for the manufacture of acid nitriles of the general formula

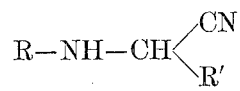

which consists in heating a polymolecular Schiff base obtainable from an aromatic amin and an aliphatic aldehyde with a solution of hydrocyanic acid.

3. The process for the manufacture of acid nitriles of the general formula $$C_6H_5-NH-CH{<}^{CN}_{R'}$$

which consists in heating a polymolecular Schiff base obtainable from anilin and an aliphatic aldehyde with a solution of hydrocyanic acid.

4. The process for the manufacture of an acid nitrile of the formula $$C_6H_5-NH-CH{<}^{CN}_{H}$$

which process consists in heating anhydroformaldehyde-anilin with a solution of hydrocyanic acid.

5. The process for the manufacture of an acid nitrile of the formula $$C_6H_5-NH-CH{<}^{CN}_{H}$$

which process consists in heating anhydroformaldehyde-anilin with a solution of hydrocyanic acid in dilute alcohol.

In testimony whereof I have hereunto set my hand in the presence of two subscribing witnesses.

OTTO J. GRAUL.

Witnesses:
   JACOB ADRIAN,
   J. ALEC LLOYD.